(12) United States Patent
Kang et al.

(10) Patent No.: US 12,522,135 B1
(45) Date of Patent: Jan. 13, 2026

(54) LAMP HOUSING MOUNTING FOR FRONT TRUNK-TYPE HOOD

(71) Applicants: Hyundai Motor Company, Seoul (KR); Kia Corporation, Seoul (KR)

(72) Inventors: Chang Kyun Kang, Superior Township, MI (US); Kihyun Cho, Gyeonggi-do (KR); Jacob Tonks, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/947,311

(22) Filed: Nov. 14, 2024

(51) Int. Cl.
*B60Q 3/30* (2017.01)
*B60Q 3/40* (2017.01)

(52) U.S. Cl.
CPC ................... *B60Q 3/30* (2017.02); *B60Q 3/40* (2017.02)

(58) Field of Classification Search
CPC .................... B60Q 3/30; B60Q 3/40
See application file for complete search history.

(56) References Cited

U.S. PATENT DOCUMENTS

2019/0241138 A1* 8/2019 Salter ................. B60Q 3/64
2022/0242308 A1* 8/2022 Park .................... B60Q 1/28

FOREIGN PATENT DOCUMENTS

WO    WO-9734779 A1 * 9/1997 ............... B60Q 3/06

OTHER PUBLICATIONS

Innovation Q+ NPL Search (Year: 2024).*

* cited by examiner

*Primary Examiner* — Anabel Ton
(74) *Attorney, Agent, or Firm* — Fox Rothschild LLP (57) ABSTRACT

A front trunk ("frunk") hood assembly is provided. The front trunk ("frunk") hood assembly may comprise a hood component, comprising an outer hood panel and an inner hood panel, a lamp, a lamp bracket configured to secure the lamp. The lamp bracket may be configured to form a bridge between the outer hood panel and the inner hood panel. In preferred aspects, the front trunk hood assembly may further comprise i) a striker and ii) an extension panel coupled to the hood component and the striker. The front trunk hood assembly may be coupled to and/or a component of a vehicle.

20 Claims, 6 Drawing Sheets

LAMP HOUSING MOUNTING FOR FRONT TRUNK-TYPE HOOD

BACKGROUND

Technical Field

Embodiments of the present disclosure relate to systems for lamp housing mounting for a front trunk (or "frunk")-type hood of a vehicle.

Background

Since the battery in battery electric vehicles is often not located under the hood where a traditional gasoline-powered or diesel-powered engine would be located, the space under the hood is relatively devoid of equipment, allowing a front trunk or storage area (or "frunk") to be positioned under the hood. Because of this, a large front storage area has been a key feature for battery electric vehicles.

Figure 1A:
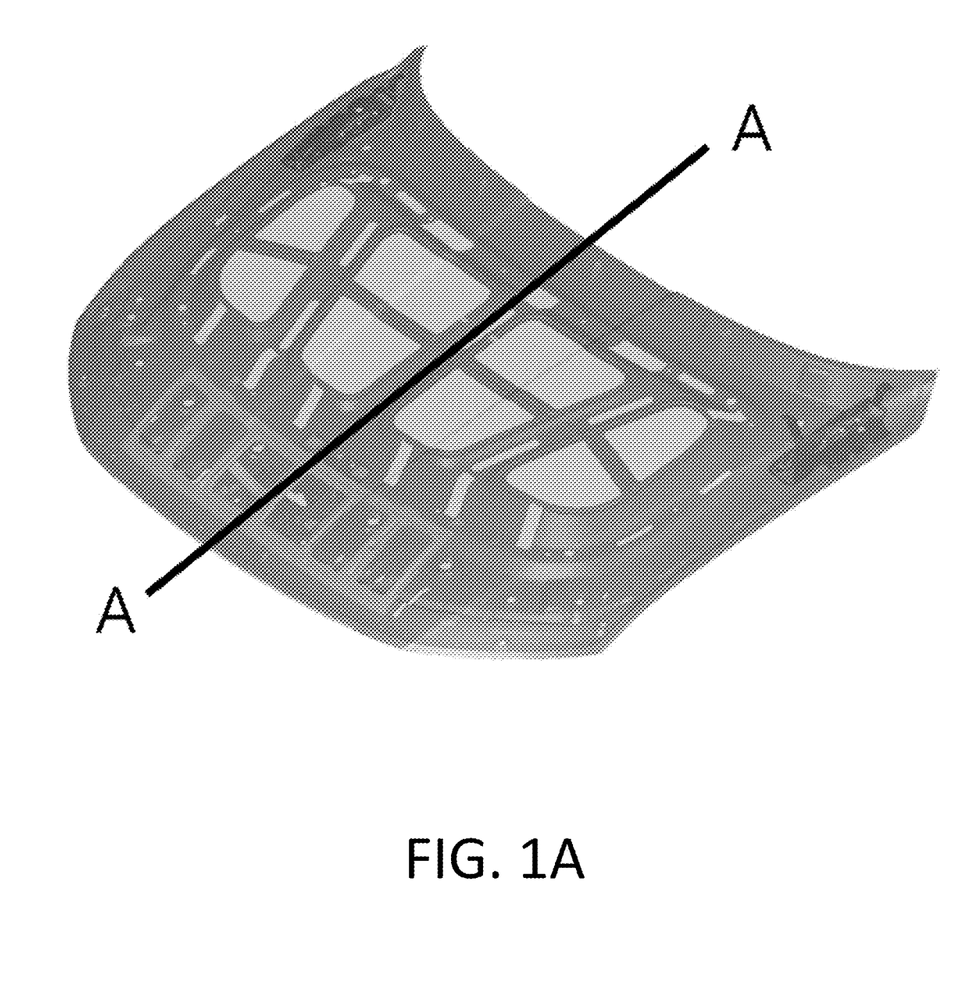
FIG. 1A illustrates an example conventional hood of a vehicle.
Figure 1B:
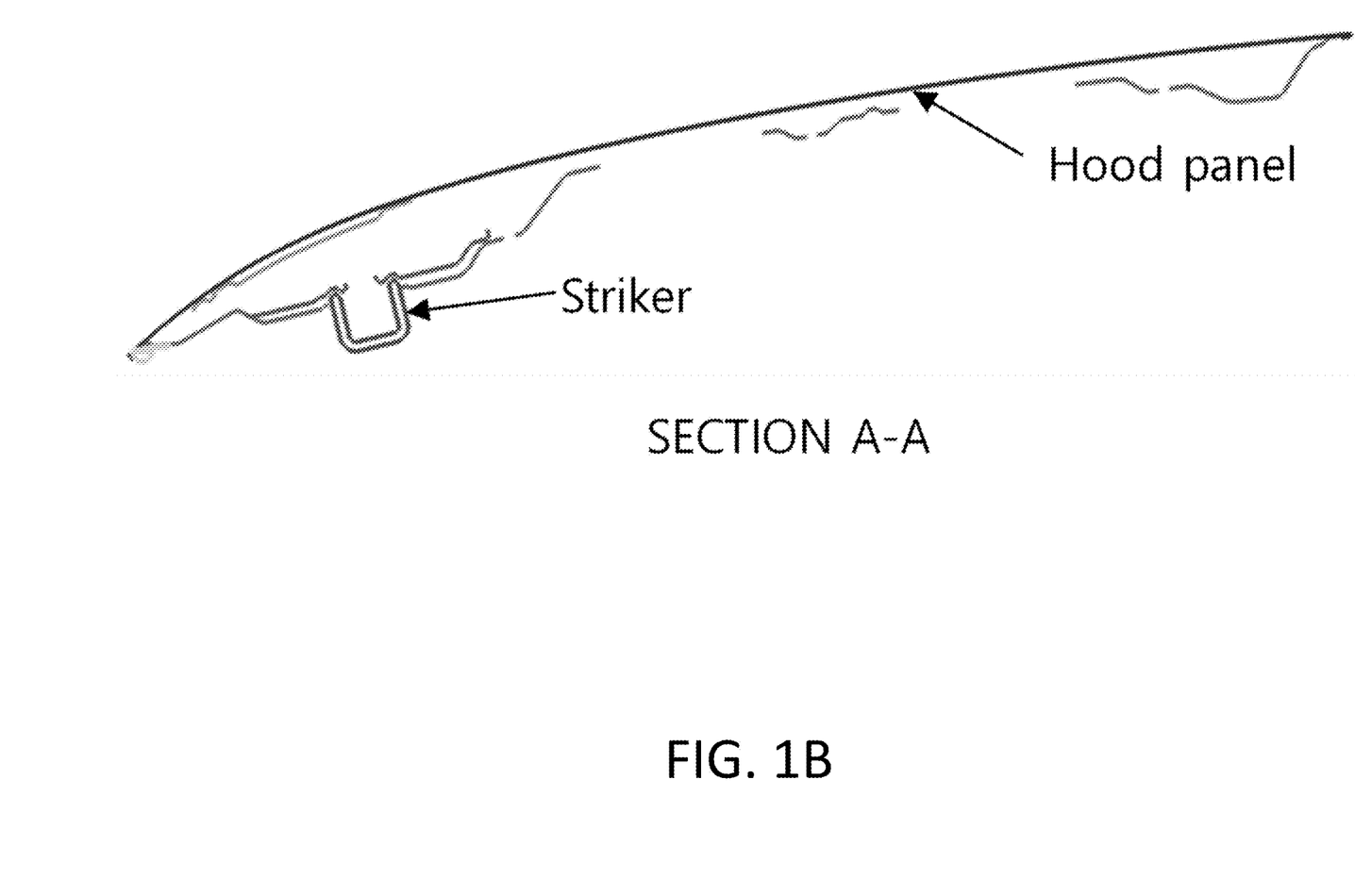
FIG. 1B illustrates a sectional view of the example conventional hood as shown in FIG. 1A, along section A-A.

Given the popularity and uses of a frunk, hood size for battery electric vehicles has grown to accommodate a large frunk. Additionally, as shown in the example conventional hood shown in FIGS. 1A-1B, conventional hood types have limited packaging space, and a striker position along the hood panel results in restrictions on putting a lamp on the hood and opening of the frunk. Additionally, with the removal of many of the components under the hood that would otherwise be present on a traditional gasoline-powered or diesel-powered vehicle, the structural stiffness of a frunk is typically less than the hood in traditional gasoline-powered or diesel-powered vehicles with engines under the hoods.

SUMMARY

According to an object of the present disclosure, a front trunk (or front storage area or "frunk") hood assembly is provided. The front trunk hood assembly may comprise a hood component, comprising an outer hood panel and an inner hood panel, a lamp, and a lamp bracket configured to secure the lamp.

In preferred aspects, the lamp bracket may be configured to form a bridge between the outer hood panel and the inner hood panel.

In preferred aspects, the front trunk hood assembly may further comprise i) a striker and ii) an extension panel coupled to the hood component and the striker.

According to an exemplary embodiment, the lamp may comprise a horizontal light bar.

According to an exemplary embodiment, the lamp bracket may comprise a recessed pocket.

According to an exemplary embodiment, the recessed pocket may be configured to enable the lamp to be inset into the hood component.

According to an exemplary embodiment, the extension panel may comprise a sheet molding compound.

According to an exemplary embodiment, the extension panel may comprise an outer component and an inner component.

According to an exemplary embodiment, the lamp bracket may be positioned to form one or more forward mounting points for mounting the extension panel.

According to an exemplary embodiment, the forward mounting points may be configured to offset a moment caused by the striker.

According to an object of the present disclosure, a system is provided. The system may comprise a vehicle comprising a front trunk hood assembly. The front trunk hood assembly may comprise a hood component, comprising an outer hood panel and an inner hood panel, a lamp, a lamp bracket configured to secure the lamp.

In preferred aspects, the lamp bracket may be configured to form a bridge between the outer hood panel and the inner hood panel.

In preferred aspects, the front trunk hood assembly of the system may further comprise i) a striker and ii) an extension panel coupled to the hood component and the striker.

According to an exemplary embodiment, the lamp may comprise a horizontal light bar.

According to an exemplary embodiment, the lamp bracket may comprise a recessed pocket, According to an exemplary embodiment, the recessed pocket may be configured to enable the lamp to be inset into the hood component.

According to an exemplary embodiment, the extension panel may comprise a sheet molding compound.

According to an exemplary embodiment, the extension panel may comprise an outer component and an inner component.

According to an exemplary embodiment, the lamp bracket may be positioned to form one or more forward mounting points for mounting the extension panel.

According to an exemplary embodiment, the forward mounting points may be configured to offset a moment caused by the striker.

According to an exemplary embodiment, the vehicle may comprise a battery configured to power the lamp.

According to an exemplary embodiment, the vehicle may comprise an electric vehicle.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below, Unless specifically noted, the drawings referred to in this Brief Description of Drawings should be understood as not being drawn to scale and like reference numerals refer to like parts throughout the various figures unless otherwise specified.

DETAILED DESCRIPTION

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating" "estimating," "initiating" "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit" "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value, Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RA N) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements, A general purpose processor may be a microprocessor, but in the alternative, the processor may be any processor, controller, microcontroller, or state machine, A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to exemplary embodiments, systems for lamp housing mounting for a front trunk (or "frunk")-type hood of a vehicle are provided.

Figure 2:
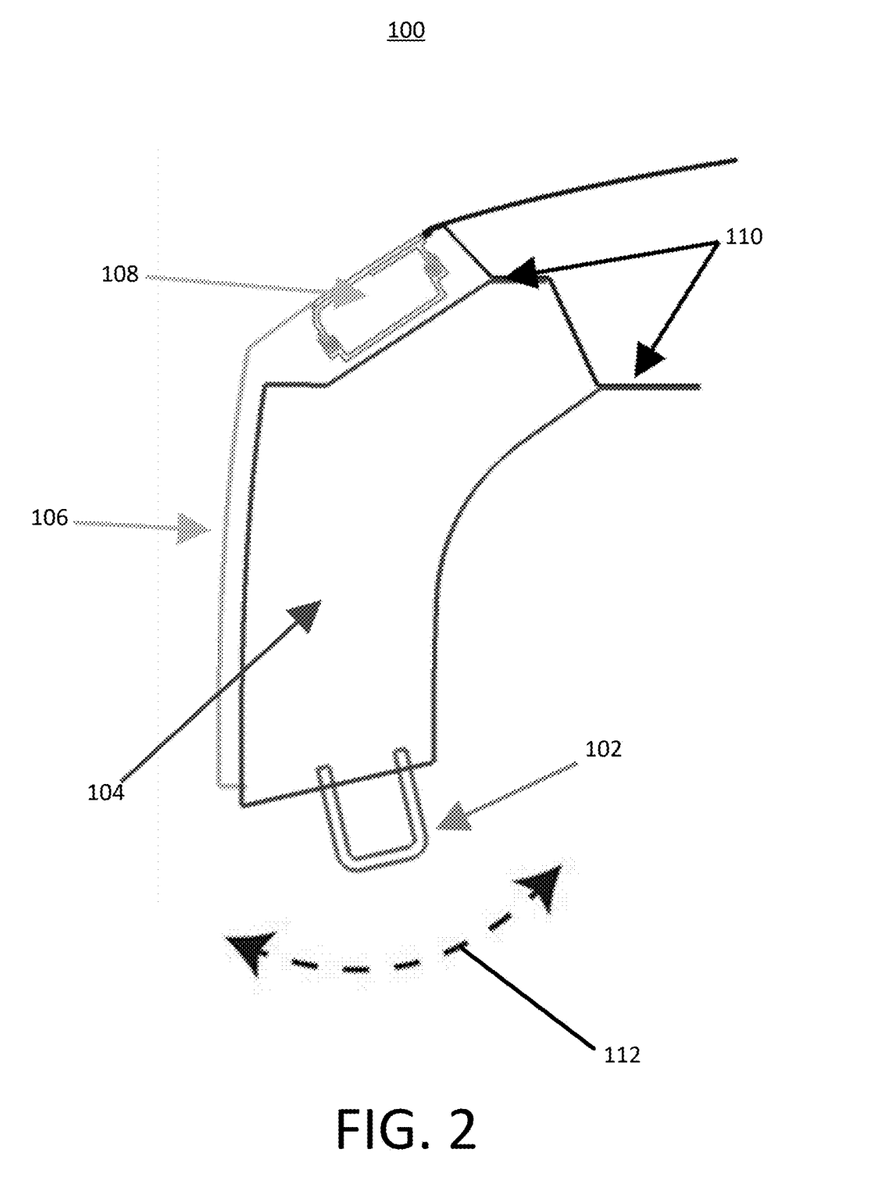
FIG. 2 illustrates a sectional view of a front trunk ("frunk") hood assembly.

Referring now to FIG. 2, a sectional view of a front trunk hood assembly 100 is illustratively depicted.

The frunk hood assembly 100 may be configured to be secured over a vehicle's front hood section. The frunk hood assembly 100 may comprise a striker 102 configured to secure the front trunk hood assembly 100 in a closed position, and a lower panel 104 having one or more lower panel joints 110 positioned behind a load point of the striker 102. The front trunk hood assembly 100 may comprise an exterior garnish 106, and a lamp 108 (e.g., a light bar or other suitable lamp). The lamp 108 may comprise lamp packaging housing the lamp 108. The front trunk hood assembly 100 may be configured to open and close, causing the striker 102 to move along movement path 112.

Both lower panel joints 110 may be located behind the striker 102 load point, resulting in poor panel strength due to the lamp 108 packaging, and a moment caused by the striker 102 may put excessive stress on the lower panel joints 110. These issues are addressed by the frunk hood assembly 100 illustrated in FIGS. 3A-4C.

Figures 3A, 3B:
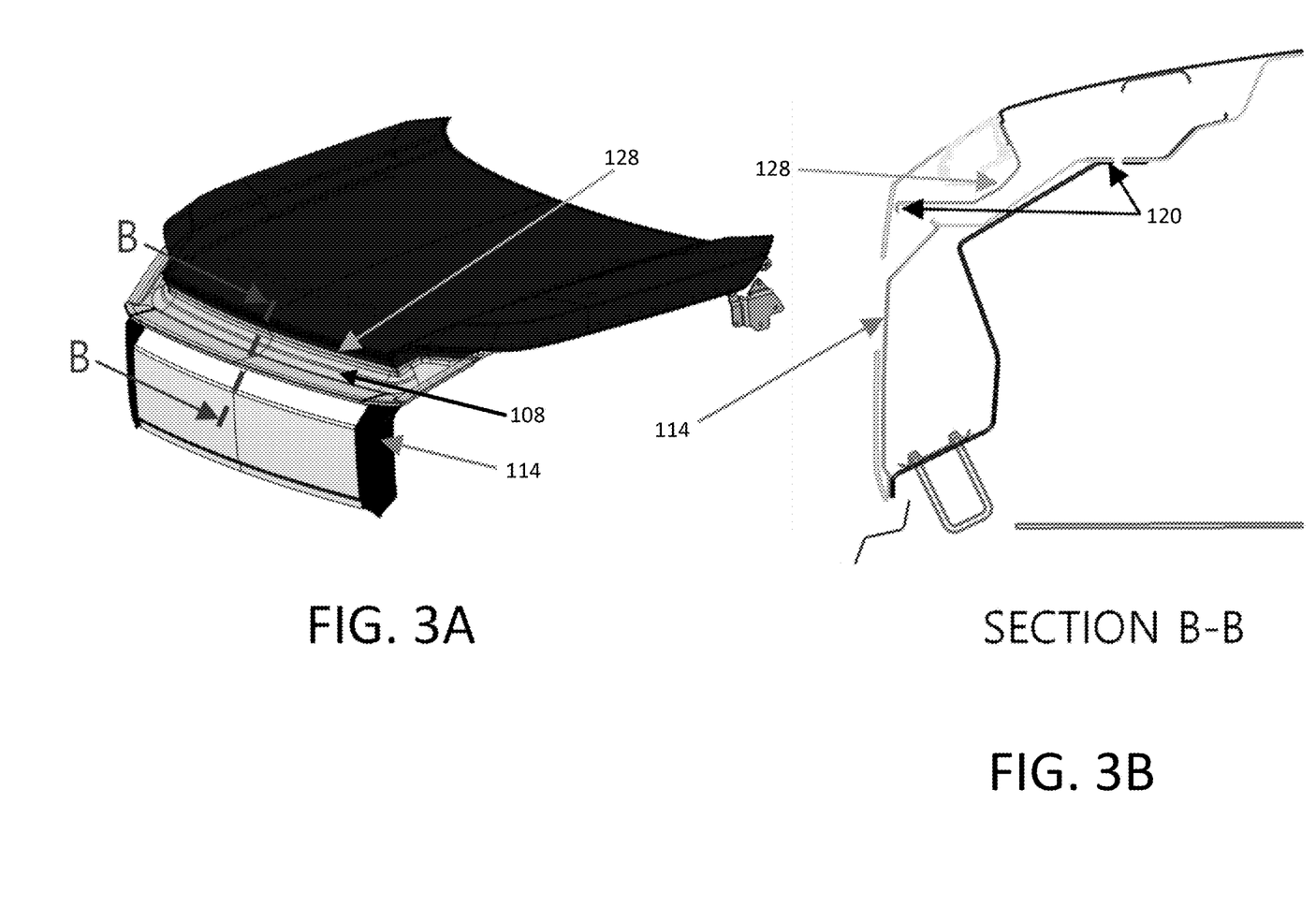
FIG. 3A illustrates an example frunk hood assembly of a vehicle, according to an exemplary embodiment of the present disclosure.
FIG. 3B illustrates a sectional view of the example frunk hood assembly as shown in FIG. 3A, along section B-B.

Referring now to FIGS. 3A-4C, an example front trunk hood assembly 100 of a vehicle (FIG. 3A), a sectional view (FIG. 3B) of the example front trunk hood assembly 100 as shown in FIG. 3A, along section B-B, a partially exploded view (FIG. 4A) of the example front trunk hood assembly 100 as shown in FIG. 3A, a sectional view (FIG. 4B) of the example front trunk hood assembly 100 as shown in FIG. 3A, along section B-B, and an exploded view (FIG. 4C) of the example front trunk hood assembly 100 as shown in FIG. 3A are illustratively depicted, in accordance with exemplary embodiments of the present disclosure.

Figure 4A:
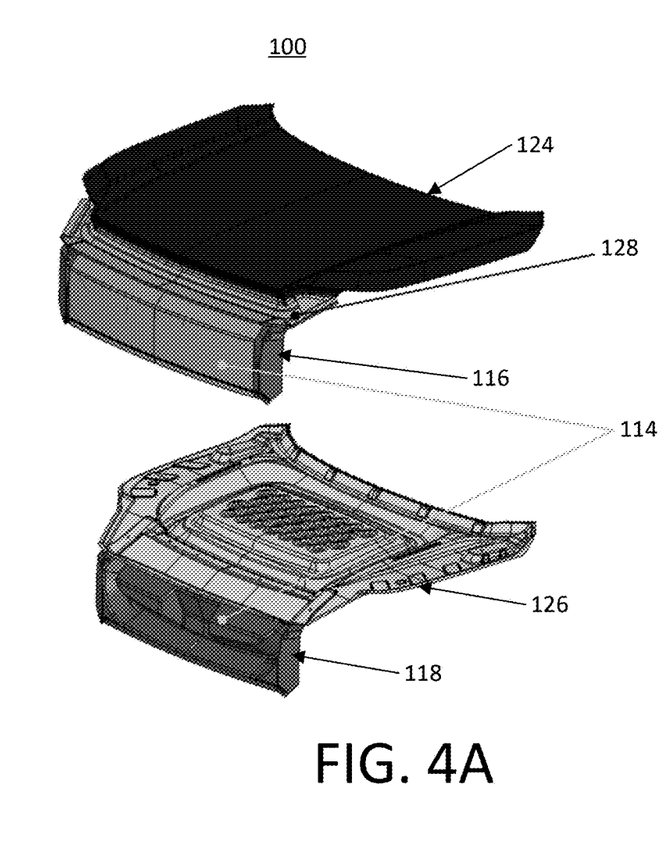
FIG. 4A illustrates a partially exploded view of the example frunk hood assembly as shown in FIG. 3A, according to an exemplary embodiment of the present disclosure.
Figure 4B:
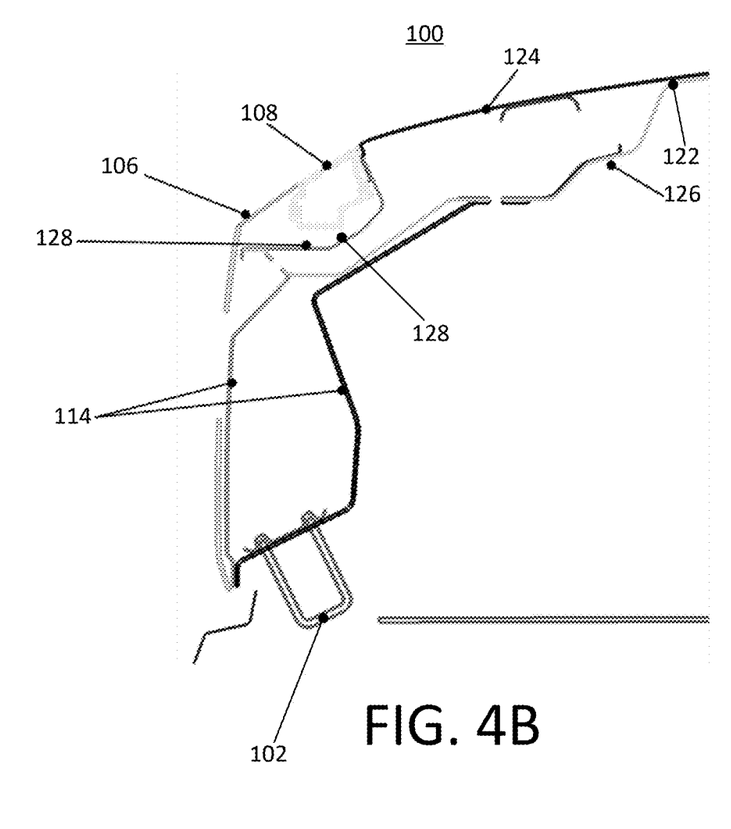
FIG. 4B illustrates a sectional view of the example frunk hood assembly as shown in FIG. 3A, along section B-B.
Figure 4C:
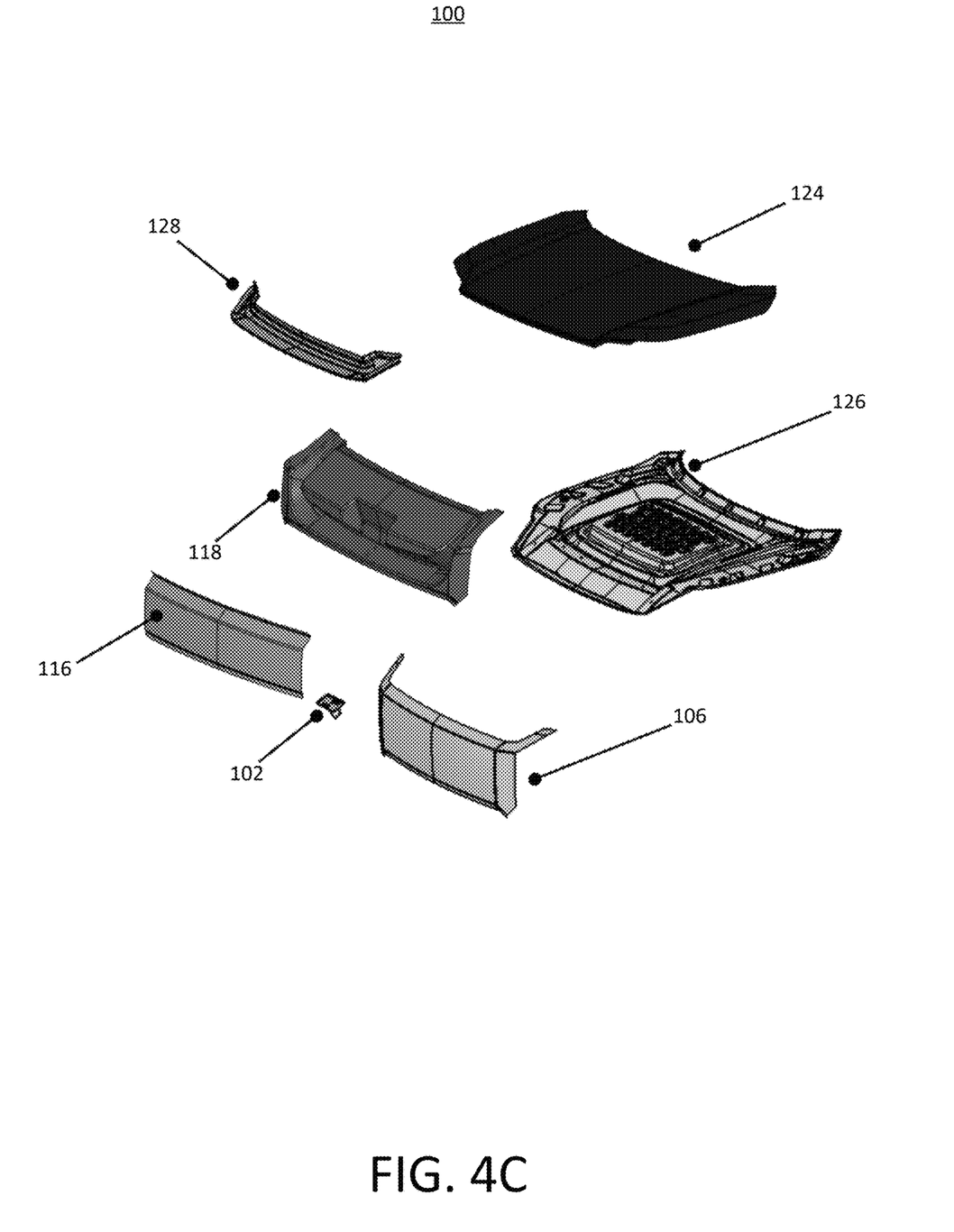
FIG. 4C illustrates an exploded view of the example frunk hood assembly as shown in FIG. 3A, according to an exemplary embodiment of the present disclosure.

According to an exemplary embodiment, the front trunk hood assembly 100 may comprise a striker 102 configured to secure the frunk hood assembly 100 in a closed position, and an extension panel 114. According to an exemplary embodiment, the extension panel 114 may comprise a sheet molding compound (SMC) extension panel 114. It is noted, however, that the extension panel 114 may comprise one or more other suitable materials while maintaining the spirit and functionality of the present disclosure. According to an exemplary embodiment, the extension panel 114 is a two-piece extension panel (as shown, e.g., in FIG. 4A-4C, showing an outer component 116 and an inner component 118). It is noted, however, that the extension panel 114 may comprise greater or fewer pieces, while maintaining the spirit and functionality of the present disclosure.

According to an exemplary embodiment, the extension panel 114 may comprise a plurality of extension panel joints 120. According to an exemplary embodiment, a striker 102 load point may be positioned between the plurality of extension panel joints 120.

The front trunk hood assembly 100 may comprise an exterior garnish 106, a lamp 108 (e.g., a light bar or other suitable lamp), and a hood component 122. The hood component 122 may comprise an outer hood panel 124 and an inner hood panel 126, According to an exemplary embodiment, the hood component 122 may be is configured to accommodate the lamp 108 (e.g., a horizontal light bar) and the attached lower extension panel 114.

According to an exemplary embodiment, the front trunk hood assembly 100 may comprise a lamp bracket 128 configured to secure the lamp 108 to the frunk hood assembly 100. The lamp bracket 128 may be configured to act as a bridge between the hood outer panel 124 and the inner hood panel 126.

According to an exemplary embodiment, the lamp bracket 128 and the inner hood panel 126 provide more forward mounting points for mounting the lower extension panel 114, and cause the moment caused by striker 102 to be offset by the forward mounting points. According to an exemplary embodiment, the lamp bracket 128 may comprise a recessed pocket 130 into which the lamp 108 may be inserted. The recessed pocket 130 enables mounting points for the lamp 108 (e.g., a horizontal light bar or other suitable lamp) to be inset into the hood component 122 and span the width of the hood 122.

According to an exemplary embodiment, the front trunk hood assembly 100 may be coupled to and/or a component of a vehicle. According to an exemplary embodiment, the lamp 108 may be configured to be powered by one or more batteries of the vehicle and the one or more batteries may be configured to power the lamp. According to an exemplary embodiment, the vehicle may comprise one or more computing devices. The lamp 108 and/or the one or more batteries may be coupled to and/or in electronic communication with the one or more computing devices. The computing device may comprise a processor, a memory, and/or a user interface (e.g., a graphical user interface). The computing device may be configured to send and/or receive commands/data/input/etc. (e.g., turning on the lamp 108, turning off the lamp 108, opening the front trunk hood assembly 100, etc.) via one or more external systems via wired and/or wireless connection (e.g., via the cloud).

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A front trunk hood assembly, comprising:
   a hood component, comprising an outer hood panel and an inner hood panel;
   a lamp; and
   a lamp bracket configured to secure the lamp,
   wherein the lamp bracket forms a bridge between the outer hood panel and the inner hood panel.

2. The front trunk hood assembly of claim 1 further comprising i) a striker and ii) an extension panel coupled to the hood component and the striker.

3. The front trunk hood assembly of claim 1, wherein the lamp comprises a horizontal light bar.

4. The front trunk hood assembly of claim 1, wherein the lamp bracket comprises a recessed pocket.

5. The front trunk hood assembly of claim 4, wherein the recessed pocket is configured to enable the lamp to be inset into the hood component.

6. The front trunk hood assembly of claim 2, wherein the extension panel comprises a sheet molding compound.

7. The front trunk hood assembly of claim 2, wherein the extension panel comprises an outer component and an inner component.

8. The front trunk hood assembly of claim 2, wherein the lamp bracket is positioned to form one or more forward mounting points for mounting the extension panel.

9. The front trunk hood assembly of claim 8, wherein the forward mounting points are configured to offset a moment caused by the striker.

10. A system, comprising:
   a vehicle comprising a front trunk hood assembly,
   wherein the front trunk hood assembly comprises:
      a hood component, comprising an outer hood panel and an inner hood panel;
      a lamp; and
      a lamp bracket configured to secure the lamp,
      wherein the lamp bracket forms a bridge between the outer hood panel and the inner hood panel.

11. The system of claim 10 further comprising: i) a striker and ii) an extension panel coupled to the hood component and the striker.

12. The system of claim 10, wherein the lamp comprises a horizontal light bar.

13. The system of claim 10, wherein the lamp bracket comprises a recessed pocket.

14. The system of claim 13, wherein the recessed pocket is configured to enable the lamp to be inset into the hood component.

15. The system of claim 11, wherein the extension panel comprises a sheet molding compound.

16. The system of claim 11, wherein the extension panel comprises an outer component and an inner component.

17. The system of claim 11, wherein the lamp bracket is positioned to form one or more forward mounting points for mounting the extension panel.

18. The system of claim 17, wherein the forward mounting points are configured to offset a moment caused by the striker.

19. The system of claim 10, wherein the vehicle comprises a battery configured to power the lamp.

20. The system of claim 10, wherein the vehicle comprises an electric vehicle.

* * * * *